United States Patent [19]

Smoczynski

[11] Patent Number: 4,647,276
[45] Date of Patent: Mar. 3, 1987

[54] ROSARY CARD

[76] Inventor: Frank E. Smoczynski, 5N 365 Hanson Rd., St. Charles, Ill. 60174

[21] Appl. No.: 778,435

[22] Filed: Sep. 20, 1985

[51] Int. Cl.⁴ ............................................. G09B 19/00
[52] U.S. Cl. .................................................... 434/246
[58] Field of Search .................. 434/246, 245; 235/123

[56] References Cited

U.S. PATENT DOCUMENTS

| | | |
|---|---|---|
| 1,744,059 | 8/1930 | Hennegan . |
| 2,351,918 | 6/1944 | Brennan . |
| 2,376,266 | 5/1945 | Moore . |
| 2,717,737 | 9/1955 | Hoelscher ...................... 434/246 X |
| 2,827,161 | 3/1958 | Rosa . |
| 2,897,606 | 8/1959 | Rosa . |
| 2,912,770 | 11/1959 | Goddard . |
| 3,042,302 | 7/1962 | Mues . |
| 3,416,989 | 12/1968 | Lawler . |

FOREIGN PATENT DOCUMENTS 564936  2/1944  United Kingdom ................ 434/246

*Primary Examiner*—William H. Grieb
*Attorney, Agent, or Firm*—Joseph P. Gastel

[57] ABSTRACT

A rosary card fabricated from a sheet of planar sheet material having protrusions on its outer edges designating the various parts of the rosary and also having cutouts in the card designating other portions of the rosary and also having pictures of beads thereon resembling a rosary and also having various parts designated by numerals as an aid in learning the rosary and also having script thereon for instructions in reciting the rosary.

21 Claims, 3 Drawing Figures

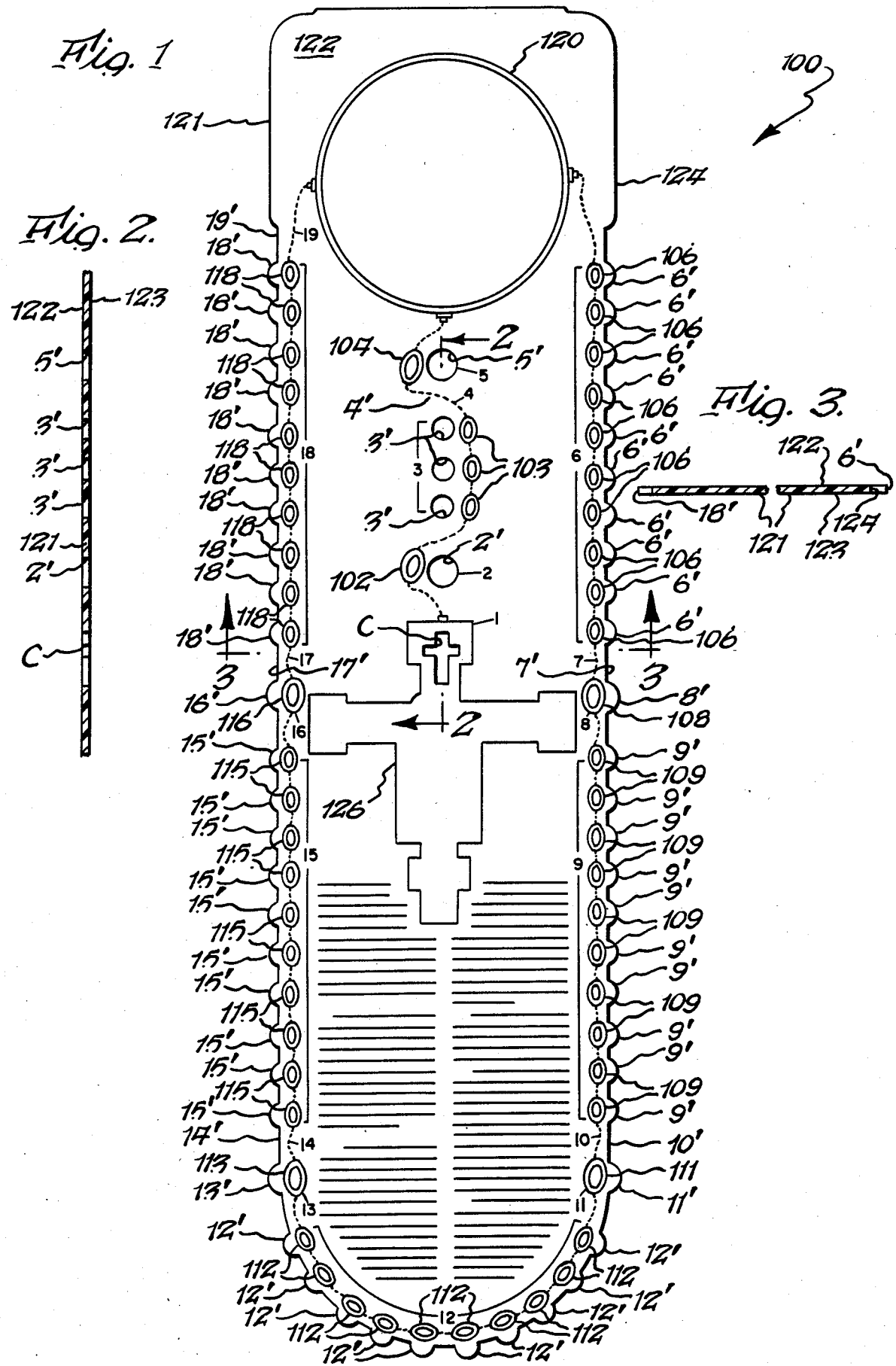

ROSARY CARD

BACKGROUND OF THE INVENTION

The present invention relates to a rosary card which may be used in both teaching the recital of the rosary and for actual prayer.

By way of background, rosary devices utilized in the past were either relatively expensive, complicated, or cumbersome. Furthermore, insofar as known, prior rosary devices which could actually be used for prayer also did not have instructional information thereon which would enable one to learn the rosary.

SUMMARY OF THE INVENTION

It is one object of the present invention to provide an improved rosary prayer card which can be used for instructing people in the saying of the rosary.

It is another object of the present invention to provide a rosary card which is fabricated from a sheet of planar material and which is of a configuration which can be used in reciting the rosary.

A further object of the present invention is to provide a rosary card which can be produced simply and economically and therefore can be capable of low cost widespread distribution. Other objects and attendant advantages of the present invention will readily be perceived hereafter.

The present invention relates to a rosary card comprising a planar sheet-like body having an outer periphery, and a plurality of protrusions on said outer periphery lying in the same plane as said planar sheet-like body, said protrusions representing various portions of the rosary.

The various aspects of the present invention will be more fully understood when the following portions of the specification are read in conjunction with the accompanying drawings wherein:

BRIEF DESCRIPTION OF THE DRAWINGS

FIG. 1 is a plan view of the rosary card of the present invention;

FIG. 2 is a fragmentary cross-sectional view taken substantially along line 2—2 of FIG. 1; and FIG. 3 is a fragmentary cross sectional view taken substantially along line 3—3 of FIG. 1.

DESCRIPTION OF THE PREFERRED EMBODIMENTS

The rosary card 100 includes a planar sheet-like body 121 having an upper surface 122 and an undersurface 123 and a periphery 124. The planar sheet-like body 121 is fabricated from sheet semi-rigid plastic of the type used for plastic credit cards approximately 0.018 mils thick, but it can be of any desired practical thickness.

By way of introduction, the numerals drawn with a lettering guide may be printed on the card itself as an instructional aid, and those numerals which are drawn freehand with lead lines are for purposes of explaining the various constructional details of rosary card 100.

The following numerals of 1 through 19, inclusive, which represent the steps in reciting the rosary, may be printed on the card itself as shown when it is to be used as an instructional tool, but may be omitted on cards which are to be used for actual prayer. In this regard, a cutout cross C proximate printed numeral 1, which designates the first step in reciting the rosary, is located centrally in body 121 for being felt while making of the sign of the Cross and saying the Apostles' Creed. Next in sequence is a cutout large circle 2' proximate printed numeral 3, which represents the second step in saying the rosary. The large circle 2' is to be felt during the saying of the "Our Father." Thereafter, three smaller circular cutouts 3' are bracketed by the printed numeral 3, which represents the third step in saying the rosary. Cutouts 3' are located in the body of the card and are to be felt during the saying of three "Hail Marys." A card body portion 4' proximate printed numeral 4 is located after the third circular cutout 3' and it is to be felt during the saying of "Glory be to the Father." A large circular cutout 5' proximate printed numeral 5 is positioned after card portion 4' and is to be felt during the announcing of the first mystery and the saying of the "Our Father." Pictures of beads 102, 103 and 104 are located alongside the holes 2', 3' and 5', respectively. The pictures of beads are connected by pictures of a chain (not numbered).

Ten equally spaced protrusions 6' are bracketed by numeral 6, which represents the sixth step in saying the rosary. The ten protrusions 6' are located on periphery 124 and are to be felt during the saying of ten "Hail Marys." These are followed by a straight edge portion 7' next to printed numeral 7 which is to be felt during the saying of "Glory be to the Father." A peripheral protrusion 8' is proximate printed numeral 8, and it is to be felt during the announcing of the second mystery and the saying of the "Our Father."

Ten equally spaced protrusions 9' are bracketed by printed numeral 9, which represents the ninth step in the saying of the rosary. Protrusions 9' are felt during the saying of ten "Hail Marys." An elongated peripheral portion 10' is proximate printed numeral 10 and is felt during the saying of "Glory be to the Father." Thereafter, a single protrusion 11' proximate printed numeral 11 is to be felt during the saying of the third mystery and then the saying of "Our Father." Bead pictures 106, 108, 109 and 111, which are connected by a chain picture (not numbered), are adjacent protrusions 6', 8', 9' and 11', respectively.

The ten protrusions 12' proximate printed numeral 12 and the associated bracket at the lower end of body 121 are felt during the saying of ten "Hail Marys." The protrusion 13' proximate printed numeral 13 is felt during the announcing of the fourth mystery and then saying the "Our Father." The peripheral card portion 14' proximate printed numeral 14 and following the protrusion 13' is felt during the saying of "Glory be to the Father." The ten following protrusions 15' bracketed by printed numeral 15 are felt during the saying of ten "Hail Marys." The peripheral protrusion 16' proximate printed numeral 16 is felt during the announcing of the fifth mystery and then the saying of "Our Father." The straight peripheral portion 17' proximate printed numeral 17 is felt during the saying of "Glory be to the Father." The ten protrusions 18' bracketed by printed numeral 18 are are felt during the saying of ten "Hail Marys," and the straight peripheral portion 19' proximate printed numeral 19 is felt during the saying of "Glory be to the Father." Bead pictures 111, 112, 113, 115, 116 and 118 lie alongside peripheral protrusions designated by printed numerals 11, 12, 14, 15, 16 and 18, respectively, and are connected by a picture of a chain (not numbered).

In addition, a picture of religious figures, namely, the Virgin Mary and Child, can be placed within the portion denoted by the circular border 120, and another picture, namely, Jesus on the Cross, may be placed within the stylized picture of the cross 126. The horizontal lines located between the bottom of cross 126 and the pictures of beads at printed numeral 12 may be filled with necessary script. Suitable script can also appear on the rear face 123 of body 121. This script can be the various prayers and may include instructional material in reciting the rosary.

As noted above, the printed numerals 1–19, inclusive, are for instructional purposes, namely, to represent the steps in reciting the rosary, and these may be omitted on cards used for actual prayer.

It will be appreciated that the protrusions on the edges of the card may be of shapes and sizes other than as shown, and that the card itself may be of any desired size, and that the cut-out area of the cross may be different from that shown.

It can thus be seen that the rosary card of the present invention is manifestly capable of attaining the above objects and while a preferred embodiment of the present invention has been disclosed, it will be appreciated that it is not limited thereto but may be otherwise embodied within the scope of the following claims.

What is claimed is:

1. A rosary card comprising an elongated planar sheetlike body having a top edge, a bottom edge, a first side edge, a second side edge, and a longitudinal axis between said first and second side edges, a first series of first spaced protrusions descending along said first side edge and representing portions of the rosary, a second series of second spaced protrusions descending along said first side edge between said first series of said first spaced protrusions and said bottom edge and representing portions of the rosary, a third protrusion on said first side edge located between said first and second series of spaced protrusions and representing a portion of the rosary, a third series of fourth spaced protrusions extending along said bottom edge and representing a portion of the rosary, a fifth protrusion spaced between said second and third series of spaced protrusions for representing a portion of the rosary, a fourth series of sixth spaced protrusions ascending along said second side edge representing a portion of the rosary, a seventh protrusion between said third and fourth series representing a portion of the rosary, a fifth series of spaced eighth protrusions located above said fourth series of spaced protrusions representing a portion of the rosary, a ninth protrusion between said fourth and fifth series of protrusions representing a portion of the rosary, all of said protrusions lying in the same plane as said planar sheet-like body, and edge portions on said side edges between certain of said protrusions for representing portions of the rosary.

2. A rosary card as set forth in claim 1 including a picture of a bead alongside each of said protrusions.

3. A rosary card as set forth in claim 1 including a plurality of cutouts extending entirely through said planar sheet-like body and representing additional portions of the rosary.

4. A rosary card as set forth in claim 1 including numerals printed on said card proximate said protrusions for designating the steps in reciting the rosary.

5. A rosary card as set forth in claim 4 including a plurality of cutouts extending entirely through said planar sheet-like body representing additional portions of the rosary.

6. A rosary card as set forth in claim 1 including a plurality of cutouts extending entirely through said planar sheet-like body and representing additional portions of the rosary, said cutouts being of different shapes to represent different parts of the rosary.

7. A rosary card as set forth in claim 1 wherein said various protrusions on said first side edge are substantially symmetrical to said various protrusions on said second side edge.

8. A rosary card as set forth in claim 1 wherein said bottom edge is rounded and wherein said third series of spaced protrusions is substantially symmetrical about said longitudinal axis.

9. A rosary card as set forth in claim 1 wherein said edge portions include a first straight edge portion on said first side edge between said third protrusion and said first series of protrusions for representing a portion of the rosary, a second straight edge portion on said first side edge between said fifth protrusion and said second series of protrusions for representing a portion of the rosary, a third straight edge portion on said second side edge between said seventh protrusion and said fourth series of protrusions for representing a portion of the rosary, and a fourth straight edge portion on said second side edge between said ninth protrusion and said fifth series of protrusions for representing a portion of the rosary.

10. A rosary card comprising a planar sheet-like body having an outer periphery including side edges, a plurality of protrusions on said side edges lying in the same plane as said planar sheet-like body, said protrusions representing various portions of the rosary, and a plurality of cutouts extending entirely through said planar sheet-like body and representing additional portions of the rosary.

11. A rosary card as set forth in claim 10 including edge portions on said side edges between certain of said protrusions for representing portions of the rosary.

12. A rosary card as set forth in claim 10 wherein certain of said cutouts are circular and one of said cutouts is in the form of a cross.

13. A rosary card as set forth in claim 12 including at least one photo of a religious figure on said card.

14. A rosary card as set forth in claim 12 including script pertaining to the rosary on said card.

15. A rosary card as set forth in claim 14 wherein said script is on the front and back of said card.

16. A rosary card as set forth in claim 10 wherein said protrusions are in spaced groups representing parts of the rosary.

17. A rosary card as set forth in claim 10 including script on said card pertaining to said rosary.

18. A rosary card as set forth in claim 17 including numerals on said card for designating steps in reciting the rosary.

19. A rosary card as set forth in claim 17 including a picture of a bead alongside each of said protrusions.

20. A rosary card as set forth in claim 10 including a picture of a bead alongside certain of said cutouts.

21. A rosary card as set forth in claim 10 including numerals printed on said card proximate said protrusions for designating the steps in reciting the rosary.

* * * * *